United States Patent
Diab et al.

(10) Patent No.: US 7,234,061 B1
(45) Date of Patent: Jun. 19, 2007

(54) METHODS AND APPARATUS FOR VERIFYING MODULES FROM APPROVED VENDORS

(75) Inventors: Wael Diab, Menlo Park, CA (US);
John McCool, Los Gatos, CA (US);
Eric Weber, San Jose, CA (US);
Anshul Sadana, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 854 days.

(21) Appl. No.: 09/927,999

(22) Filed: Aug. 10, 2001

Related U.S. Application Data

(60) Provisional application No. 60/302,341, filed on Jun. 29, 2001.

(51) Int. Cl.
*H04L 9/00* (2006.01)
*H04K 1/00* (2006.01)

(52) U.S. Cl. .......................... 713/176; 380/2
(58) Field of Classification Search ................. 713/176; 380/2
See application file for complete search history.

(56) References Cited

U.S. PATENT DOCUMENTS

| | | | | |
|---|---|---|---|---|
| 5,781,723 A | * | 7/1998 | Yee et al. ................... | 713/200 |
| 5,933,503 A | * | 8/1999 | Schell et al. ................ | 713/189 |
| 6,073,118 A | * | 6/2000 | Gormish et al. .............. | 705/39 |
| 6,192,420 B1 | | 2/2001 | Tsai et al. .................... | 710/10 |
| 6,220,873 B1 | | 4/2001 | Samela et al. ............. | 439/76.1 |
| 6,285,990 B1 | | 9/2001 | Lee et al. ..................... | 705/60 |
| 6,484,128 B1 | * | 11/2002 | Sekiya et al. ................ | 702/185 |
| 6,546,487 B1 | * | 4/2003 | McManis ..................... | 713/169 |
| 6,563,600 B1 | * | 5/2003 | Young ........................ | 358/1.5 |
| 6,571,335 B1 | * | 5/2003 | O'Donnell et al. .......... | 713/173 |
| 6,615,350 B1 | * | 9/2003 | Schell et al. ................. | 713/168 |
| 6,804,727 B1 | * | 10/2004 | Rademacher ................. | 710/9 |
| 6,816,968 B1 | * | 11/2004 | Walmsley .................... | 713/168 |
| 2003/0037239 A1 | * | 2/2003 | Leung et al. ................ | 713/169 |
| 2004/0031030 A1 | * | 2/2004 | Kidder et al. ................ | 717/172 |

OTHER PUBLICATIONS

Menezes, Alfred J. Handbook of Applied Cryptography. CRC Press. Washington DC. 1997. p. 363.*
Computer Hope. Definition of "Serial Number". 1998-2006. www.computerhope.com/jargon/s/serinumb.htm.*

* cited by examiner

*Primary Examiner*—Emmanuel L. Moise
*Assistant Examiner*—Michael Pyzocha
(74) *Attorney, Agent, or Firm*—BainwoodHuang

(57) ABSTRACT

A technique verifies a that a module is from an approved vendor. The technique involves obtaining vendor data and a first magic code from a module (e.g., a small form factor pluggable component), and generating a second magic code based on the vendor data. The technique further involves outputting (i) a magic code valid signal when the second magic code matches the first magic code, and (ii) a magic code invalid signal when the second magic code does not match the first magic code. Operation of a computerized device having the module can be based on the valid and invalid signals (e.g., a voltage level, a bit that is set or cleared, a value in a register, etc.). For example, a supplier of the electronic device can configure software running on the computerized device to disable the module if the first and second magic codes do not match.

22 Claims, 6 Drawing Sheets

METHODS AND APPARATUS FOR VERIFYING MODULES FROM APPROVED VENDORS

CROSS REFERENCE TO RELATED APPLICATIONS

This application claims the benefit of priority to U.S. Provisional Application Ser. No. 60/302,341, filed Jun. 29, 2001 and entitled "Methods and Apparatus for Verifying Vendor Approved Modules," the teachings of which are hereby incorporated by reference in their entirety.

BACKGROUND OF THE INVENTION

Some manufacturers provide electronic devices that use off-the-shelf third-party vendor components. Some electronic device manufacturers further offer to qualify such vendor components (e.g., test the vendor components under strict conditions) and, if the vendor components qualify, certify that the vendor components are from an "approved" vendor. An end customer who purchases an electronic device from an electronic device manufacturer and a component from an approved vendor typically receives an extra assurance from the electronic device manufacturer that the electronic device and the component will work normally when the component is properly installed and configured within the electronic device. On the other hand, an end customer who purchases an off-the-shelf component which is not from an approved vendor may receive no assurance from the electronic device manufacturer that the component will work properly within the device.

An example of a conventional electronic device, which is capable of using off-the-shelf components from an approved vendor, is a data communications device that handles network traffic. Such a device can use off-the-shelf transceivers called Giga-bit Interface Converters (GBICs) which are available from a variety of component vendors. Both off-the-shelf components from approved vendors as well as off-the-shelf components from non-approved vendors are available for this conventional device.

When an electronic device using components from a non-approved vendor fails, it can be difficult and expensive for the electronic device manufacturer to determine whether the failure is a result of a problem in the device itself or the components from the non-approved vendor. Accordingly, electronic device manufacturers often only agree to support device configurations which exclusively use components from an approved vendor. For device configurations that do not exclusively use components from an approved vendor, the electronic device manufacturer may not make any guarantees or may not provide any warrantees.

SUMMARY OF THE INVENTION

Unfortunately, there are deficiencies to the above-described approach of simply supporting device configurations which use components from approved vendors and not supporting device configurations which use components from non-approved vendors. For example, a customer may claim that an electronic device does not operate properly and further claim that the device uses components from an approved vendor. In response, the electronic device manufacturer may send a technician to the customer site to determine the cause of the failure and to fix it. Unfortunately, when the technician visits the customer site, the technician may discover that the device actually uses non-approved components (i.e., components from non-approved vendors) which were purchased by the customer in order to reduce costs. At this point, it is difficult for the technician to leave without servicing the device (even though the device uses non-approved components) since the customer has been waiting for service for some time. In particular, if the technician left without servicing the device, the electronic device manufacturer may lose customer goodwill and develop a poor service reputation. On the other hand, if the technician services the device, the only solution to make the device operate properly may be for the technician to now sell, install and configure a set of components from an approved vendor thus resulting in a disappointing and added expense for the customer. Accordingly, with the above-described approach, it is often difficult or impossible for the electronic device manufacturer deal with customers that use non-approved components in a manner that results in a positive outcome. That is, the electronic device manufacturer is often forced to endure (i.e., respond to) difficult customer calls resulting from the use of non-approved components. Often, the manufacturer may not find out that the customer is using non-approved components until it is too late.

Additionally, the electronic device manufacturer may desire the capability to control and track which vendors supply components for the manufacturer's electronic devices. For example, the manufacturer may be able to provide "approved vendor" licenses to vendors and thus develop partner relationships with particular vendors and/or derive a profit from selling such licenses.

In contrast to the above-described conventional approach in which it is difficult or impossible for an electronic device manufacturer to enforce or require customers to use only components from approved vendors, embodiments of the invention are directed to techniques for verifying that a module is from an approved vendor based on a code from the module. When the module is installed on an electronic device, the electronic device can generate a valid signal if the code is proper, or an invalid signal if the code is improper. Accordingly, device operation can be controlled based on whether the device uses or does not use modules from an approved vendor. For example, the electronic device can disable the module if the code is improper (i.e., if the electronic device determines that the module is not from an approved vendor).

One arrangement of the invention is directed to a method for verifying that a module is from an approved vendor. The method includes the steps of obtaining vendor data and a first magic code from a module (e.g., a small form factor pluggable component), and generating a second magic code based on the vendor data. The method further includes the step of outputting (i) a magic code valid signal when the second magic code matches the first magic code, and (ii) a magic code invalid signal when the second magic code does not match the first magic code. Operation of a computerized device having the module can be based on the valid and invalid signals (e.g., a voltage level, a bit that is set or cleared, a value in a register, etc.). For example, a supplier of the computerized device (an electronic device manufacturer) can configure software running on the computerized device to disable the module in response to the invalid signal, i.e., if the first and second magic codes do not match.

In one arrangement, the computerized device includes a memory that stores a magic key. Here, the step of generating the second magic code includes the steps of reading the magic key from the memory of the computerized device, and forming the second magic code based on the magic key and the vendor data. For example, forming the second magic code can involve performing a message-digest algorithm operation on the magic key and the vendor data. Non-approved vendors without knowledge of the magic key may find it extremely difficult to provide a module with a proper first magic code thus making it difficult for non-approved vendors to provide a module that is acceptable to the computerized device (i.e., a module having a first magic code that eventually matches the second magic code generated by the computerized device).

In one arrangement, the vendor data (e.g., read from a non-volatile memory of the module) includes a vendor identification number, a character string representing a vendor name, and a module serial number. Here, the step of generating the second magic code includes the step of forming the second magic code based on the vendor identification number, the character string representing the vendor name, the module serial number, and the magic key. Since it is unlikely that a non-approved vendor will provide a module having vendor data from a different vendor (e.g., vendor data that belongs to an approved vendor), the vendor data of the module of a non-approved vendor will likely result in a non-match and thus an invalid signal.

In one arrangement, the module serial number is unique for all modules that are from an approved vendor. Accordingly, the computerized device disables any modules having the same module serial number. This enables the computerized device to detect non-approved modules which simply include a copy of the memory of another module, e.g., "knockoff" or "clone" modules containing a copy of the memory of an approved vendor module. That is, in the event the computerized device includes modules from a non-approved vendor that has simply cloned a module from an approved vendor, the computerized device can see that the modules include the same module serial number and can disable them.

The features of the invention, as described above, may be employed in computerized systems, devices and methods, as well as other electronic components such as those of Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for verifying that a module is from an approved vendor based on a code from the module. A valid signal results if the code is proper, and an invalid signal results if the code is improper. Accordingly, device operation can be controlled based on whether the device uses or does not use a vendor approved module.

Figure 1:
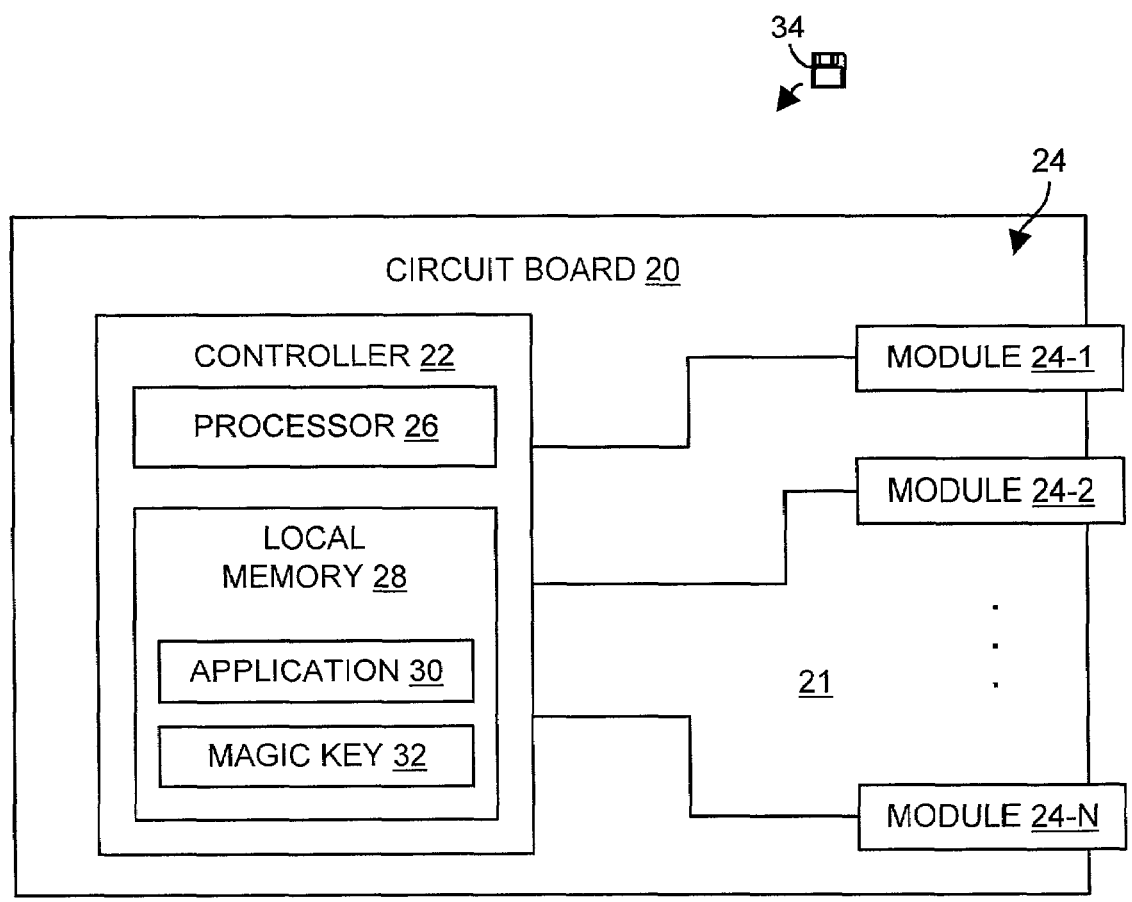
FIG. 1 shows a computerized device which is suitable for use by the invention.

FIG. 1 shows a circuit board 20 (a computerized device) which is suitable for use by the invention. The circuit board 20 includes a section of circuit board material 21, a controller 22 and a set of modules 24-1, ..., 24-N (N being a positive integer). As shown, the modules 24-1, ..., 24-N (collectively, the modules 24) connect with the controller 22 via circuit board connections (e.g., etch) of the circuit board material 21. The controller 22 includes a processor 26 and memory 28 which is preferably local to the processor 26. The memory 28 stores, among other things, an application 30 and a magic key 32.

The application 30 can be provided to the circuit board 20 from a computer program product 34. Suitable media for the computer program product 34 include one or more diskettes, tapes, CD-ROMs, network downloads, propagated signals, disk drives, combinations thereof, and the like.

Figure 2:
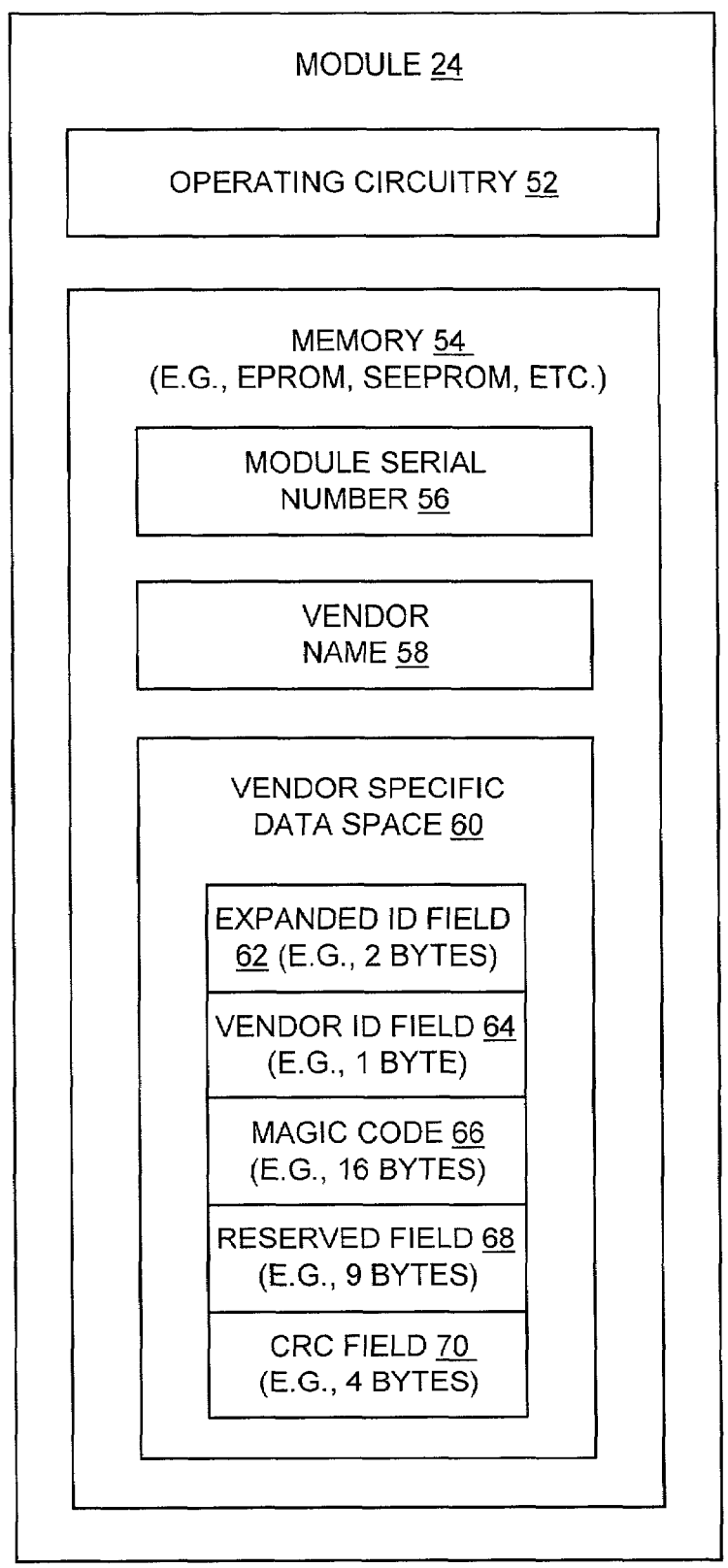
FIG. 2 shows a module which is an electronic component that is suitable for use by the computerized device of FIG. 1.

FIG. 2 shows details of a module 24. The module 24 includes operating circuitry 52 (e.g., data formatting circuitry, a transducer that converts between an electrical signal and a fiber optic signal, etc.) and memory 54 (e.g., a serial PROM). In one arrangement, the memory 54 is programmed by the vendor and is used, at least partly, for vendor identification purposes. The memory 54 includes a module serial number field 56, a vendor name field 58, and a vendor specific data space 60. The vendor specific data space 60 includes an expanded ID field 62, a vendor ID field 64, a magic code field 66, a reserved field 68 and a CRC field 70. The expanded ID field 62 and the reserved field 68 are reserved for future use.

An approved vendor programs the memory 54 (i.e., stores data in the memory 54 in a non-volatile manner) prior to shipping. In particular, the approved vendor stores a unique serial number into the module serial number field 56. The approved vendor stores a character string that identifies the approved vendor by name in the vendor name field 58. The approved vendor stores a vendor number that identifies the approved vendor in the vendor ID field 64. The approved vendor stores a magic code in the magic code field 66. In the CRC field 70 (or checksum field), the approved vendor stores an error checking value (e.g., an error detection value, an error correction value, etc.) for error checking the contents of the memory 54. The expanded ID field 62 and the reserved field 68 are reserved for future use (e.g., to identify specific mechanical interfaces, versions, etc.). In one arrangement, the expanded ID field 62 and the reserved field 68 are set blank (e.g., set to zero), and the vendor name field 58 is blank-padded and null terminated.

It should be understood that, in a circuit board 20 that exclusively uses modules 24 from an approved vendor, there are no two modules 24 with the same serial number since the module serial number field 56 of each module 24 is supposed to hold a unique value. Accordingly, if the circuit board 20 detects multiple modules 24 with the same serial number, it is likely that the circuit board 20 includes modules 24 having a memory 54 which has been copied (or cloned) from another module 24, i.e., modules 24 from a non-approved vendor.

Before an approved vendor programs the memories 54 of the modules 24, the supplier of the circuit board 20 (e.g., the circuit board manufacturer) provides (i) a unique vendor number, (ii) a range of available and unique serial numbers, and (iii) a magic key 32 (also see FIG. 1) to that approved vendor. Then, for each module 24, the approved vendor performs a magic code operation to generate a magic code which goes into the magic code field 66 of that module 24. In particular, for each module 24, the approved vendor forms a magic code based on the vendor number, a character string identifying the vendor, a unique serial number (from the provided serial number range) for that module 24 and the magic key 32. The operation for forming the magic code can be represented as follows:

magic code=magic_code_op(vendor ID, vendor name, serial number, magic key).

The approved vendor then stores the module serial number, the character string and remaining vendor specific data in the memory 54 as described above. Preferably, the approved vendor does not store the magic key 32 in the memory 54 but keeps the magic key 32 proprietary so that only the approved vendor and the circuit board supplier know of its value.

In some arrangements, the circuit board 20 forms at least a portion of a data communications device. In these arrangement, the processor 26, when operating in accordance with the application 30, performs data communications operations (e.g., routing operations, switching operations, etc.). Furthermore, in these arrangements, the set of modules 24 are network interface devices such as fiber optic transceivers. For example, the set of modules 24 can be Giga-bit Interface Converters (GBICs). A suitable network interface device is described in a publication entitled "PRELIMINARY Product Specification Long-Wavelength Pluggable SFP Transceiver FTRJ-1319-3," by Finisar Corporation of Sunnyvale, Calif., Rev. B, Jul. 7, 2000, the teachings of which are hereby incorporated by reference in their entirety. Another suitable network interface device is described in a publication entitled "Gigabit Ethernet/Fiber Channel Small Form Factor Hot-Pluggable Transceiver," by IBM Corp of Armonk, N.Y., Aug. 15, 2000, the teachings of which are hereby incorporated by reference in their entirety. Details of a Small Form Factor Hot-Pluggable Transceiver are described in a publication entitled "Cooperation Agreement for Small Form-Factor Pluggable Transceivers," posted at http://www.schelto.com/SFP/index.html, and dated Sep. 14, 2000, the teachings of which are hereby incorporated by reference in their entirety.

Figure 3:
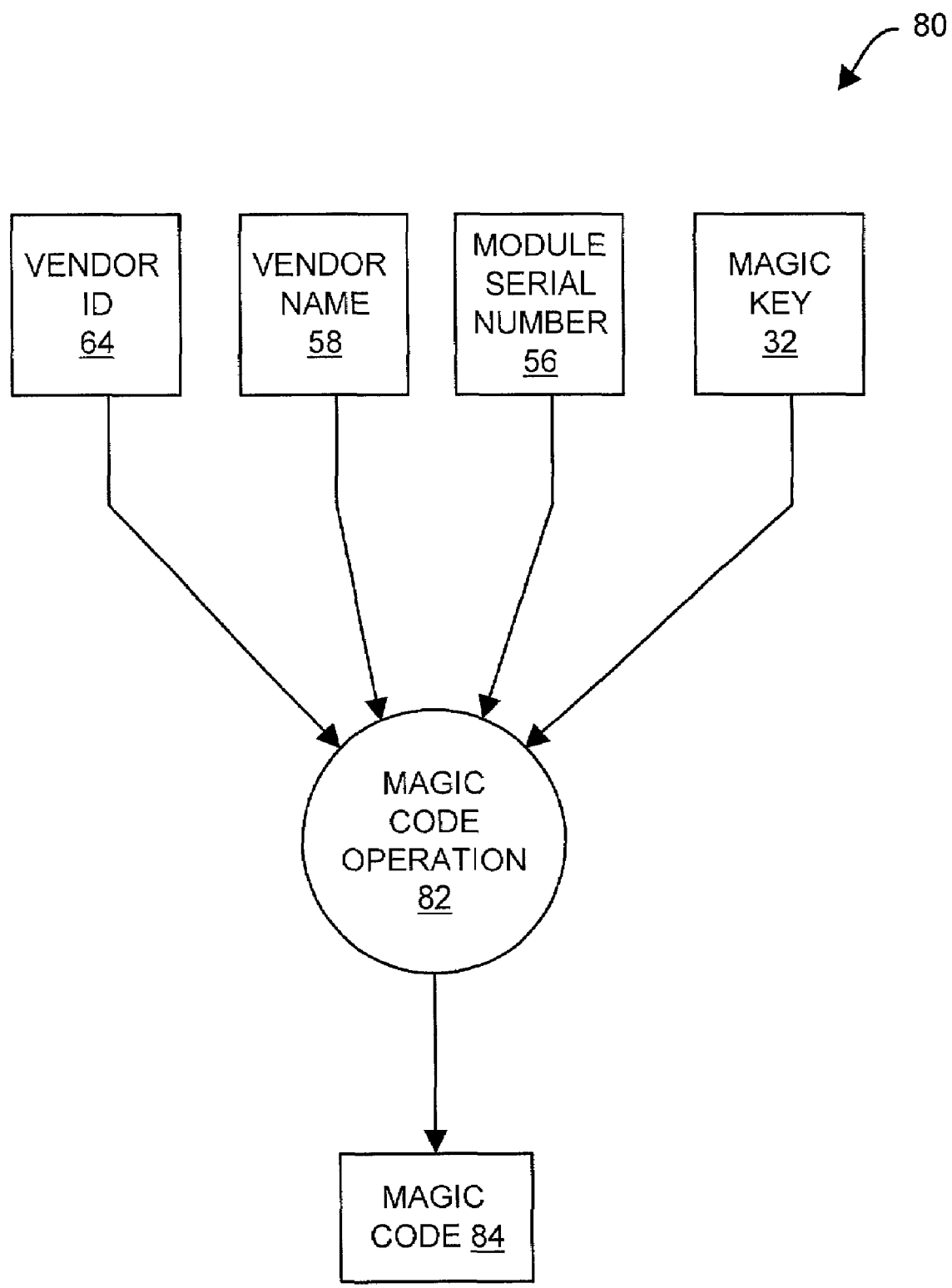
FIG. 3 shows a block diagram of an operation performed by the computerized device of FIG. 1 to generate a magic code.

FIG. 3 shows a view 80 of how a magic code operation 82 works to generate a magic code. The magic code operation 82 is based on the contents of the vendor ID 64, the vendor name 58, the module serial number 56 and the magic key 32. These values are processed by the magic code operation 82 to generate a magic code 84 (e.g., by the processor 26 running the application 30, see FIG. 1). In one arrangement, the magic code operation 82 involves the application of a message-digest algorithm (e.g., MD2, MD4, MD5, etc.). In another arrangement, the magic code operation 82 involves exclusive-OR (XOR) operations. In another arrangement, the magic code operation 82 involves the application of a different algorithm (e.g., a different encryption algorithm, an error checking algorithm, a proprietary polynomial algorithm, combinations thereof, etc.). As a result, the magic code 84 is preferably a code (e.g., 16 bytes) which is difficult to generate without the magic key 32 for high security.

As mentioned earlier, when a circuit board supplier authorizes an approved vendor to provide vendor-approved modules 24, the supplier provides the vendor with the magic key 32. The vendor can then generate and store magic codes 84 in the memories 54 of the modules 24 (e.g., EEPROM, Serial EEPROM, etc.) by performing the magic code operation 82 (see FIG. 3). The supplier programs the circuit board 20 with the same magic key 32 (see FIG. 1) so that later, when the circuit board 20 is in operation (e.g., in the field), the controller 22 of the circuit board 20 can read vendor data and the magic codes 84 (from the magic code fields 66) from the modules 24 to confirm that the modules 24 are from an authorized vendor. If the controller 22 determines that the modules 24 are not from an authorized vendor, the controller 22 shuts the modules 24 down (e.g., disables them, turns them off, etc.). Accordingly, the customer will not be able to use modules 24 which are not from an approved vendor, and will be unlikely to later call the circuit board supplier to complain that the circuit board 20 has worked for some time and suddenly and unexpectedly failed. Rather, upon installation of modules from a non-approved vendor, the customer will immediately realize that it cannot use the modules since the modules will be disabled.

Figure 4:
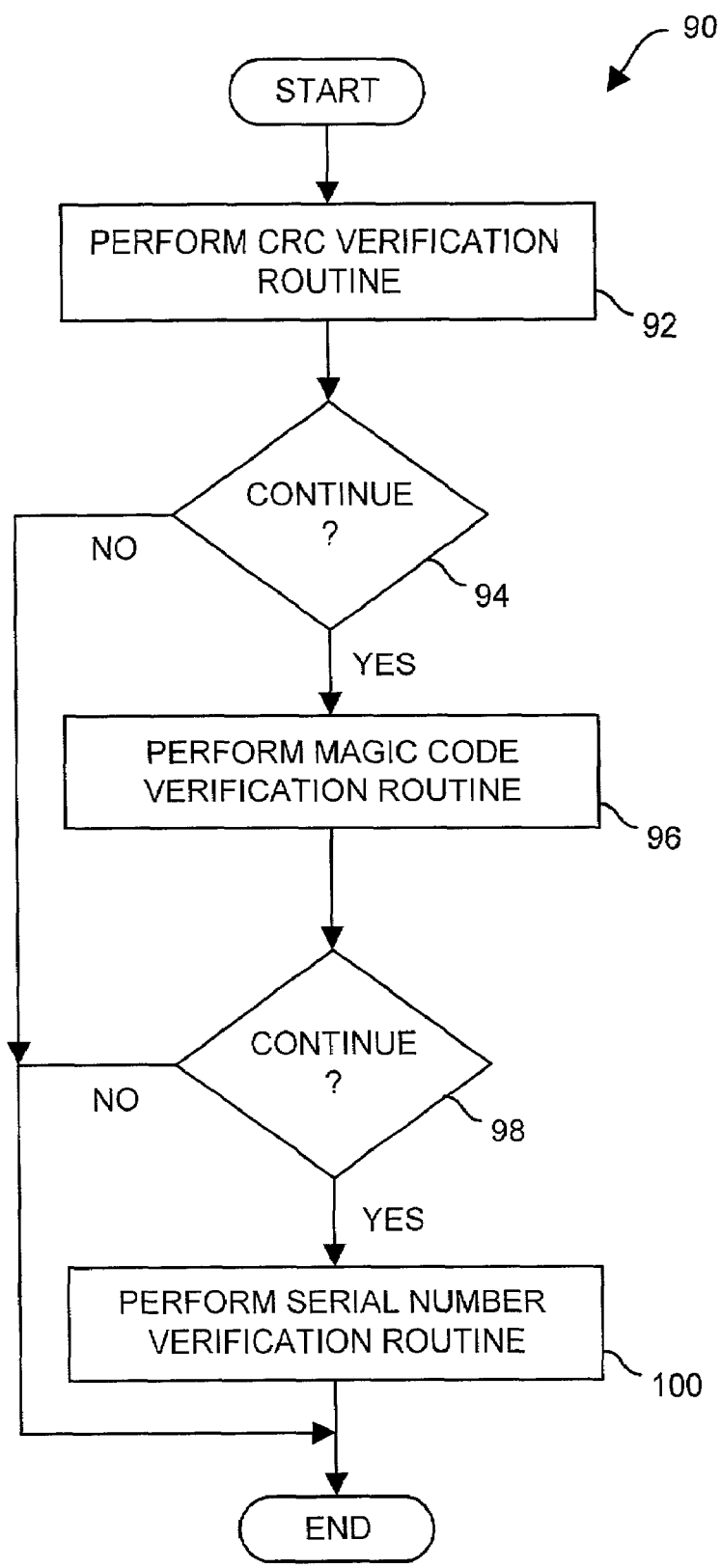
FIG. 4 is a flowchart of a procedure which is performed by the computerized device of FIG. 1.

FIG. 4 shows a flowchart of a procedure 90 which is performed by the controller 22 (i.e., the processor 26 operating in accordance with the application 30). In one arrangement, the controller 22 performs the procedure 90 in response to a power up of the device (e.g., the circuit board 20), or in response to a hot swap of a module 24 or a line card.

In step 92, the controller 22 performs a CRC verification routine on the modules 24. In particular, the controller 22 shuts down any modules 24 that have an incorrect CRC value in the CRC field 70 (see FIG. 2).

In step 94, if at least one of the modules 24 remains enabled, the controller 22 proceeds to step 96. Otherwise, the controller 22 terminates the procedure 90.

In step 96, the controller 22 performs a magic code verification routine on the modules 24. In particular, the controller 22 shuts down any modules 24 that have an incorrect magic code 84 in the magic code field 66 (FIG. 2). Accordingly, the controller 22 can screen out modules from non-approved vendors. The controller 22 then proceeds to step 98.

In step 98, if at least one of the modules 24 passes the magic code verification routine, the controller 22 proceeds to step 100. Otherwise, the controller 22 terminates the procedure 90.

In step 100, the controller 22 performs a serial number verification routine on the modules 24. In particular, the controller 22 shuts down any modules 24 that have the same serial number in the module serial number field 56. Accordingly, the controller 22 can screen out clones of a vendor approved module. The controller 22 then terminates the procedure 90.

The screening of CRC codes during step 92 enables the controller 22 to detect faulty modules 24 or modules with tampered memories 54. In particular, checking of the CRC codes ensures read operation integrity and data integrity (as well as provides security). The screening of magic codes 84 during step 96 enables the controller 22 to detect any non-authorized modules 24 based on magic codes 84 (e.g., knockoff components by unauthorized vendors). The screening of serial numbers during step 100 enables the controller 22 to identify modules 24 that improperly include the same serial number. Accordingly, the controller 22 can detect knockoff modules 24 having copies of a memory 54 from a vendor-authorized module 24.

Figure 5:
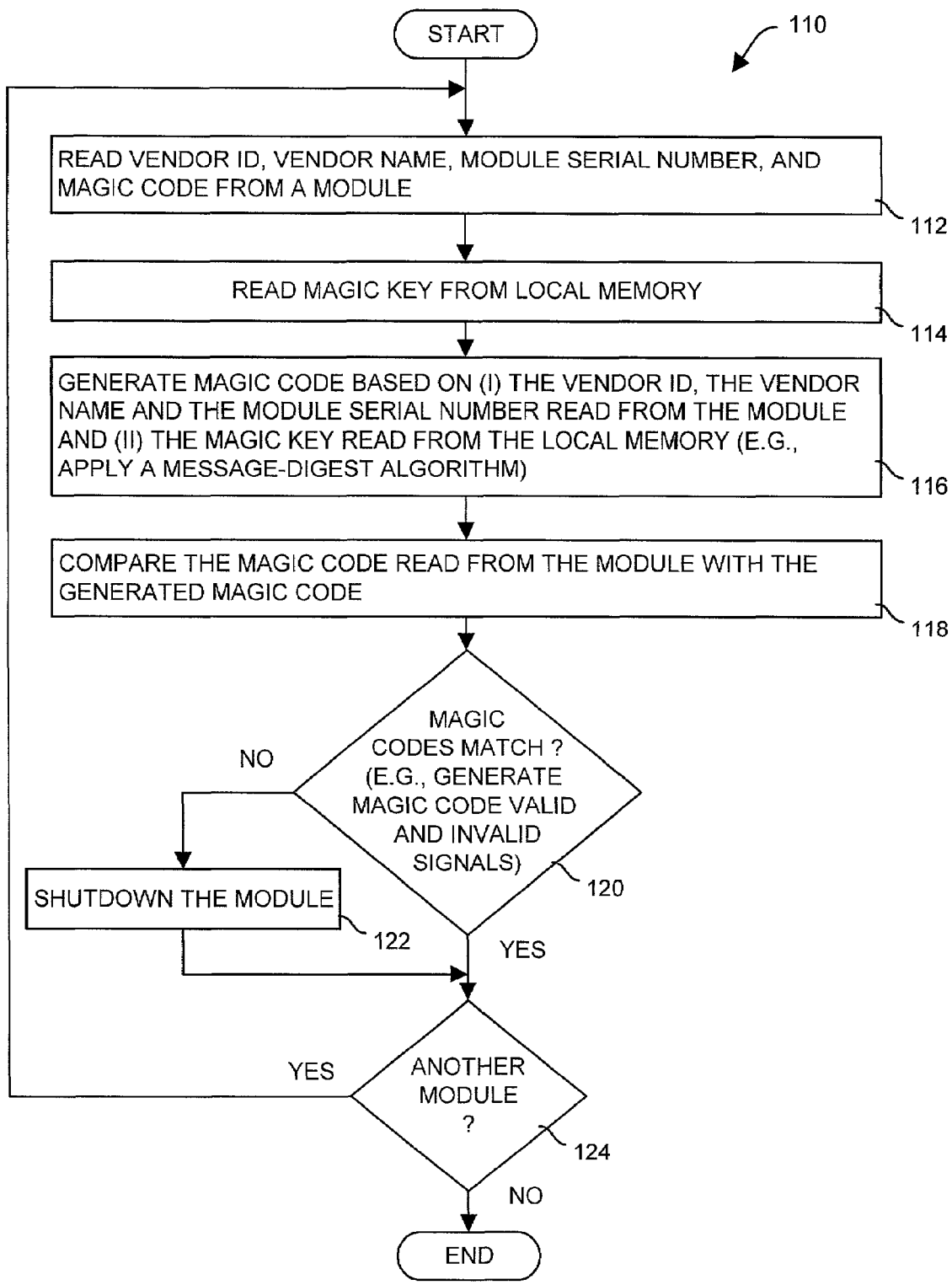
FIG. 5 is a flowchart of a step of the procedure of FIG. 4 for performing a magic code verification routine.

FIG. 5 shows a flowchart of a procedure 110 which is performed by the controller 22 which is suitable for step 96 of FIG. 4. In step 112, the controller 22 reads vendor data (e.g., contents from the vendor ID field 64, the reserved field 68 and the CRC field 70 of the memory 54, see FIG. 2), and a magic code (e.g., from the magic code field 66) from a module 24.

In step 114, the controller 22 reads a magic key 32 from the local memory 28.

In step 116, the controller 22 generates a magic code 84 based on the vendor data and the magic key 32. In one arrangement, the controller 22 applies an algorithm (e.g., MD5, XOR operations, etc.).

In step 118, the controller 22 compares the generated magic code with the magic code read from the module 24.

In step 120, if the magic codes match, the controller 22 proceeds to step 124. In particular, the controller 22 outputs a magic code valid signal (e.g., a first voltage level, a first binary code, etc.). If the magic codes do not match, the controller 22 proceeds to step 122. That is, the controller outputs a magic code invalid signal (e.g., a second voltage level, a second binary code, etc.).

In step 122, the controller 22 shuts down the module 24 because the module 24 is unauthorized (or faulty). In particular, the controller 22 disables the module 24 or treats the module 24 as being unavailable in response to the magic code invalid signal.

In step 124, the controller 22 repeats steps 112 through 122 if there are more modules 24 to test. Otherwise, the controller 22 terminates the procedure 110. Accordingly, the controller 22 shuts down any modules 24 which do not have complying magic codes (e.g., modules 24 from an unauthorized vendor).

Figure 6:
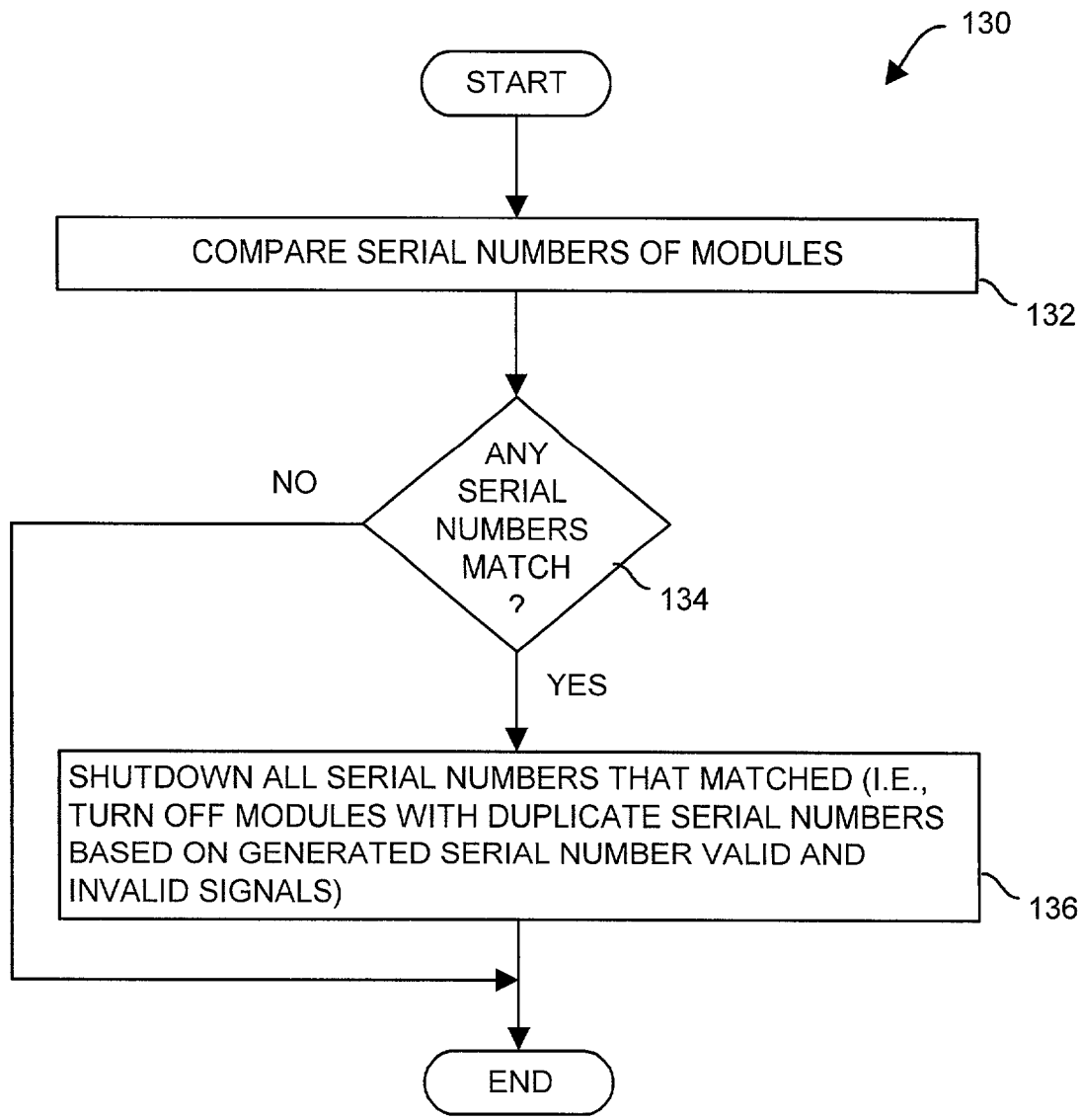
FIG. 6 is a flowchart of another step of the procedure of FIG. 4 for performing a serial number verification routine.

FIG. 6 shows a flowchart of a procedure 130 performed by the controller 22 which is suitable for step 100 of FIG. 4. In step 132, the controller 22 compares the serial numbers of the modules 24.

In step 134, the controller 22 determines whether any of the serial numbers match. In particular, the controller 22 provides serial number valid signals (e.g., first binary values) for modules 24 that have unique serial numbers, and serial number invalid signals (e.g., second binary values) for modules 24 having the same serial numbers.

In step 136, the controller 22 shuts down any modules 24 which have matching serial numbers. In particular, the controller 22 disables any modules 24 that resulted in a serial number invalid signal. Accordingly, the controller 22 shuts down any modules 24 which are copies (e.g., clones of a vendor-authorized module).

As described above, embodiments of the invention are directed to techniques for verifying that a module is from an approved vendor based on a code from the module. When the module is installed on an electronic device, the electronic device can generate a valid signal if the code is proper, or an invalid signal if the code is improper. Accordingly, device operation can be controlled based on whether the device uses or does not use modules from an approved vendor. For example, the electronic device can disable the module if the code is improper (i.e., if the electronic device determines that the module is not from an approved vendor). The features of the invention, as described above, may be employed in electronic systems, devices and procedures, as well as other computer-related components such as those of Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, the above-described computerized device was described as a data communications device by way of example only. The computerized device can be other types of devices as well such as part of a general purpose computer, a specialized computer, an electronic device that operates in accordance with application specific integrated circuits (ASICs) or field programmable gate arrays (FPGAs), analog circuitry, combinations thereof, and the like.

Additionally, it should be understood that the modules 24 were described as being GBICs (e.g., high speed bi-directional optics modules) by way of example only. The modules 24 can be other types of devices as well, e.g., other types of small form factor pluggable components, communication transceiver modules or other types of network modules, memory modules, ASICs, FPGAs, circuit boards, etc.

Furthermore, it should be understood that the circuit board 20 was described as having multiple modules 24 by way of example only. In other arrangements, the circuit board 20 includes a single module 24 and is capable of determining whether that module 24 is from an approved vendor.

Additionally, it should be understood that the results of the authentication process (see the procedure 90 of FIG. 4) can be stored and later accessed by a technician. For example, authentication results can be taken and stored in a log file when the circuit board 20 is initially configured (e.g., when shipped from the factory). Additional results can then be logged if the configuration later changes, e.g., in response to the customer later installing off-the-shelf modules 24. The technician can then refer to the log file when attempting to trouble shoot or service the circuit board 20.

Furthermore, it should be understood that the computerized device was described as residing on a circuit board by way of example only. The computerized device can have other configuration and topologies as well such as residing on multiple circuit boards, multi-chip modules (MCMs), multiple circuit boards through one or more interconnects (e.g., backplanes), etc. Such modifications and enhancements are intended to be part of embodiments of the invention, and the invention should be limited only by the spirit and scope of the claims.

What is claimed is:

1. In a computerized device, a method for verifying that a module is from an approved vendor, the module including an externally readable memory pre-programmed with vendor data and a first magic code, the method comprising the steps of:

reading the memory of the module to obtain the vendor data and first magic code therefrom;

generating a second magic code based on the vendor data; and outputting a magic code valid signal when the second magic code matches the first magic code, and a magic code invalid signal when the second magic code does not match the first magic code;

wherein the vendor data includes a module serial number, the module serial number being unique to the module when the module is from an approved vendor, and wherein the step of generating includes the step of:

forming the second magic code based on the module serial number; and further comprising the steps of:

obtaining a second serial number from a second module, the second module serial number being unique to the second module when the second module is from an approved vendor; and outputting a serial number valid signal when the module serial number of the vendor data does not match the second serial number from the second module, and a serial number invalid signal when the serial number of the vendor data matches the second serial number from the second module, and wherein:

the modules are respective first and second communications transceiver components;

the vendor data and first magic code are obtained from a non-volatile memory in the first communications transceiver component;

the vendor data includes data from a vendor name field, a vendor identification number field, and an error-checking field; and the generating and outputting steps are performed as part of a magic code verification routine upon successful completion of an error-checking routine performed on the vendor data;

and further comprising the steps of:

performing the error-checking routine on the vendor data;

if during the magic code verification routine the first magic code does not match the second magic code, then identifying the first communications transceiver component as not being from an approved vendor;

if during the magic code verification routine the first magic code does match the second magic code, then repeating the preceding steps for the second communications transceiver component;

and further wherein:

the serial number valid signal indicates that the first communications transceiver component has been identified as being from an approved vendor;

the serial number invalid signal indicates that the first communications transceiver component has been identified as not being from an approved vendor; and the step of outputting the serial number valid signal and serial number invalid signal is performed only if the first magic code matches the second magic code during the magic code verification routine for both the first and second communications transceiver components.

2. The method of claim 1 wherein the computerized device includes a memory that stores a magic key, and wherein the step of generating includes the steps of:

reading the magic key from the memory of the computerized device; and forming the second magic code based on the magic key and the vendor data.

3. The method of claim 2 wherein the step of forming includes the step of:

performing a message-digest algorithm operation on the magic key and the vendor data.

4. The method of claim 1 wherein the vendor data includes a vendor identification number, a character string representing a vendor name, and a the module serial number; and wherein the step of generating includes the step of:

forming the second magic code based on the vendor identification number, the character string representing the vendor name, and the module serial number.

5. The method of claim 4 wherein the computerized device includes a memory that stores a magic key, and wherein the step of forming includes the steps of:

reading the magic key from the memory of the computerized device; and providing the second magic code based on the vendor identification number, the character string representing the vendor name, the module serial number, and the magic key.

6. The method of claim 1 wherein the module is a small form factor pluggable component having a non-volatile memory, and wherein the step of obtaining includes the step of:

reading the vendor data from the non-volatile memory of the small form factor pluggable component.

7. The method of claim 1 wherein the module is a GBIC communication transceiver component having a non-volatile memory, and wherein the step of obtaining includes the step of:

reading the vendor data from the non-volatile memory of the GBIC communication transceiver component.

8. A method according to claim 1, wherein the externally readable memory of the module is a non-volatile memory pre-programmed with the vendor data and the first magic code prior to assembling the module into the computerized device.

9. A computerized device, comprising:

a module including an externally readable memory pre-programmed with vendor data and a first magic code; and a controller, coupled to the module, which is configured to read the memory of the module to obtain the vendor data and first magic code from the module, generate a second magic code based on the vendor data, and output a magic code valid signal when the second magic code matches the first magic code, and a magic code invalid signal when the second magic code does not match the first magic code;

wherein the vendor data includes a module serial number, the module serial number being unique to the module when the module is from an approved vendor, and wherein the controller is configured to generate the second magic code by forming the second magic code based on the module serial number;

and wherein the computerized device includes a second module, and wherein the controller is further configured to:

obtain a second serial number from the second module, the second module serial number being unique to the second module when the second module is from an approved vendor; and output a serial number valid signal when the module serial number of the vendor data does not match with the second serial number from the second module, and a serial number invalid signal when the serial number of the vendor data matches with the second serial number from the second module, and wherein:

the modules are respective first and second communications transceiver components;

the vendor data and first magic code are obtained from a non-volatile memory in the first communications transceiver component;

the vendor data includes data from a vendor name field, a vendor identification number field, and an error-checking field;

the controller is configured to generate the second magic code and output the magic code valid signal and magic code invalid signal as part of a magic code verification routine upon successful completion of an error-checking routine performed on the vendor data;

and wherein the controller is further configured to:

perform the error-checking routine on the vendor data;

if during the magic code verification routine the first magic code does not match the second magic code, then identify the first communications transceiver component as not being from an approved vendor;

if during the magic code verification routine the first magic code does match the second magic code, then repeat the preceding steps for the second communications transceiver component;

and further wherein:

the serial number valid signal indicates that the first communications transceiver component has been identified as being from an approved vendor;

the serial number invalid signal indicates that the first communications transceiver component has been identified as not being from an approved vendor; and the step of outputting the serial number valid signal and serial number invalid signal is performed only if the first magic code matches the second magic code during the magic code verification routine for both the first and second communications transceiver components.

10. The computerized device of claim 9 wherein the controller includes:

a processor; and a memory, coupled to the processor, that stores a magic key, wherein the processor is configured to generate the second magic code by (i) reading the magic key from the memory, and (ii) forming the second magic code based on the magic key and the vendor data.

11. The computerized device of claim 10 wherein the processor is configured to form the second magic code by performing a message-digest algorithm operation on the magic key and the vendor data.

12. The computerized device of claim 9 wherein the vendor data includes a vendor identification number, a character string representing a vendor name, and the module serial number, and wherein the controller is configured to generate the second magic code by forming the second magic code based on the vendor identification number, the character string representing the vendor name, and the module serial number.

13. The computerized device of claim 12 wherein the controller includes:

a processor; and a memory, coupled to the processor, that stores a magic key, wherein the processor is configured to form the second magic code by (i) reading the magic key from the memory of the computerized device, and (ii) providing the second magic code based on the vendor identification number, the character string representing the vendor name, the module serial number, and the magic key.

14. The computerized device of claim 9 wherein the module is a small form factor pluggable component having a non-volatile memory, and wherein the controller is configured to obtain the vendor data by reading the vendor data from the nonvolatile memory of the small form factor pluggable component.

15. The computerized device of claim 9 wherein the module is a GBIC communication transceiver component having a non-volatile memory, and wherein the controller is configured to obtain the vendor data by reading the vendor data from the nonvolatile memory of the GBIC communication transceiver component.

16. A computerized device according to claim 9, wherein the externally readable memory of the module is a non-volatile memory pre-programmed with the vendor data and the first magic code prior to assembling the module into the computerized device.

17. A computerized device, comprising:

a module including an externally readable memory pre-programmed with vendor data and a first magic code; and a controller coupled to the module, the controller including:

means for reading the memory of the module to obtain the vendor data and first magic code therefrom, means for generating a second magic code based on the vendor data, and means for outputting a magic code valid signal when the second magic code matches the first magic code, and a magic code invalid signal when the second magic code does not match the first magic code;

wherein the vendor data includes a module serial number, the module serial number being unique to the module when the module is from an approved vendor, and wherein the means for generating includes:

means for forming the second magic code based on the module serial number;

and wherein the controller further includes:

means for obtaining a second serial number from a second module, the second module serial number being unique to the second module when the second module is from an approved vendor; and means for outputting a serial number valid signal when the module serial number of the vendor data does not match the second serial number from the second module, and a serial number invalid signal when the serial number of the vendor data matches the second serial number from the second module, and wherein:

the modules are respective first and second communications transceiver components;

the vendor data and magic code are obtained from a non-volatile memory in the first communications transceiver component;

the vendor data includes data from a vendor name field, a vendor identification number field, and an error-checking field;

the generating and outputting steps are performed as part of a magic code verification routine upon successful completion of an error-checking routine performed on the vendor data;

and wherein the controller further comprises:

means for performing the error-checking routine on the vendor data;

means operative if during the magic code verification routine the first magic code does not match the second magic code, for identifying the first communications transceiver component as not being from an approved vendor;

means operative if during the magic code verification routine the first magic code does match the second magic code, for repeating the preceding steps for the second communications transceiver component;

and further wherein:
the serial number valid signal indicates that the first communications transceiver component has been identified as being from an approved vendor;
the serial number invalid signal indicates that the first communications transceiver component has been identified as not being from an approved vendor; and
the outputting of the serial number valid signal and serial number invalid signal is performed only if the first magic code matches the second magic code during the magic code verification routine for both the first and second communications transceiver components.

18. A computerized device according to claim 17, wherein the externally readable memory of the module is a non-volatile memory pre-programmed with the vendor data and the first magic code prior to assembling the module into the computerized device.

19. In a computerized device, a method for verifying that a module is from an approved vendor, the module including an externally readable memory pre-programmed with vendor data and a first magic code, the method comprising the steps of:
reading the memory of the module to obtain the vendor data and first magic code therefrom;
generating a second magic code based on the vendor data; and
outputting a magic code valid signal when the second magic code matches the first magic code, and a magic code invalid signal when the second magic code does not match the first magic code;
wherein the vendor data includes a module serial number, the module serial number being unique to the module when the module is from an approved vendor, and wherein the step of generating includes the step of:
forming the second magic code based on the module serial number;
and further comprising the steps of:
obtaining a second serial number from a second module, the second module serial number being unique to the second module when the second module is from an approved vendor; and
outputting a serial number valid signal when the module serial number of the vendor data does not match the second serial number from the second module, and a serial number invalid signal when the serial number of the vendor data matches the second serial number from the second module,
and wherein:
the module being verified as from an approved vendor is a first module having a first module serial number, first vendor data, and first magic code;
the method is performed by a controller of a circuit board containing the first module, the circuit board being from a circuit board supplier; and
when the first module is from an approved vendor:
(1) the first module serial number is a selected one of a range of serial numbers provided to the approved vendor by the circuit board supplier;
(2) the first vendor data and first magic code are stored in the memory of the first module as specified by the circuit board supplier;
(3) a magic key is provided to the approved vendor by the circuit board supplier and is not stored in the memory of the first module; and
(4) the first magic code is generated by the approved vendor using the magic key and the first vendor data provided by the circuit board supplier.

20. A method according to claim 19, wherein the first and second modules are both contained on the circuit board.

21. A computerized device, comprising:
a module including an externally readable memory pre-programmed with vendor data and a first magic code; and
a controller, coupled to the module, which is configured to
read the memory of the module to obtain the vendor data and first magic code from the module,
generate a second magic code based on the vendor data, and
output a magic code valid signal when the second magic code matches the first magic code, and a magic code invalid signal when the second magic code does not match the first magic code;
wherein the vendor data includes a module serial number, the module serial number being unique to the module when the module is from an approved vendor, and wherein the controller is configured to generate the second magic code by forming the second magic code based on the module serial number;
and wherein the computerized device includes a second module, and wherein the controller is further configured to:
obtain a second serial number from the second module, the second module serial number being unique to the second module when the second module is from an approved vendor; and
output a serial number valid signal when the module serial number of the vendor data does not match with the second serial number from the second module, and a serial number invalid signal when the serial number of the vendor data matches with the second serial number from the second module,
and wherein:
the module of the computerized device is a first module having a first module serial number, first vendor data, and first magic code;
the computerized device is from a computerized device supplier; and
when the first module is from an approved vendor:
(1) the first module serial number is a selected one of a range of serial numbers provided to the approved vendor by the computerized device supplier;
(2) the first vendor data and first magic code are stored in the memory of the first module as specified by the computerized device supplier;
(3) a magic key is provided to the approved vendor by the computerized device supplier and is not stored in the memory of the first module; and
(4) the first magic code is generated by the approved vendor using the magic key and the first vendor data provided by the computerized device supplier.

22. A computerized device, comprising:
a module including an externally readable memory pre-programmed with vendor data and a first magic code; and
a controller coupled to the module, the controller including:
means for reading the memory of the module to obtain the vendor data and first magic code therefrom,
means for generating a second magic code based on the vendor data, and
means for outputting a magic code valid signal when the second magic code matches the first magic code, and a magic code invalid signal when the second magic code does not match the first magic code;

wherein the vendor data includes a module serial number, the module serial number being unique to the module when the module is from an approved vendor, and wherein the means for generating includes:

means for forming the second magic code based on the module serial number;

and wherein the controller further includes:

means for obtaining a second serial number from a second module, the second module serial number being unique to the second module when the second module is from an approved vendor; and means for outputting a serial number valid signal when the module serial number of the vendor data does not match the second serial number from the second module, and a serial number invalid signal when the serial number of the vendor data matches the second serial number from the second module, and wherein:

the module of the computerized device is a first module having a first module serial number, first vendor data, and first magic code;

the computerized device is from a computerized device supplier; and when the first module is from an approved vendor:

(1) the first module serial number is a selected one of a range of serial numbers provided to the approved vendor by the computerized device supplier;

(2) the first vendor data and first magic code are stored in the memory of the first module as specified by the computerized device supplier;

(3) a magic key is provided to the approved vendor by the computerized device supplier and is not stored in the memory of the first module; and (4) the first magic code is generated by the approved vendor using the magic key and the first vendor data provided by the computerized device supplier.

* * * * *